Jan. 2, 1934.  H. P. STEVENS  1,942,155
PACKING RING AND VALVE FOR INTERNAL COMBUSTION ENGINES AND THE LIKE
Filed June 7, 1932
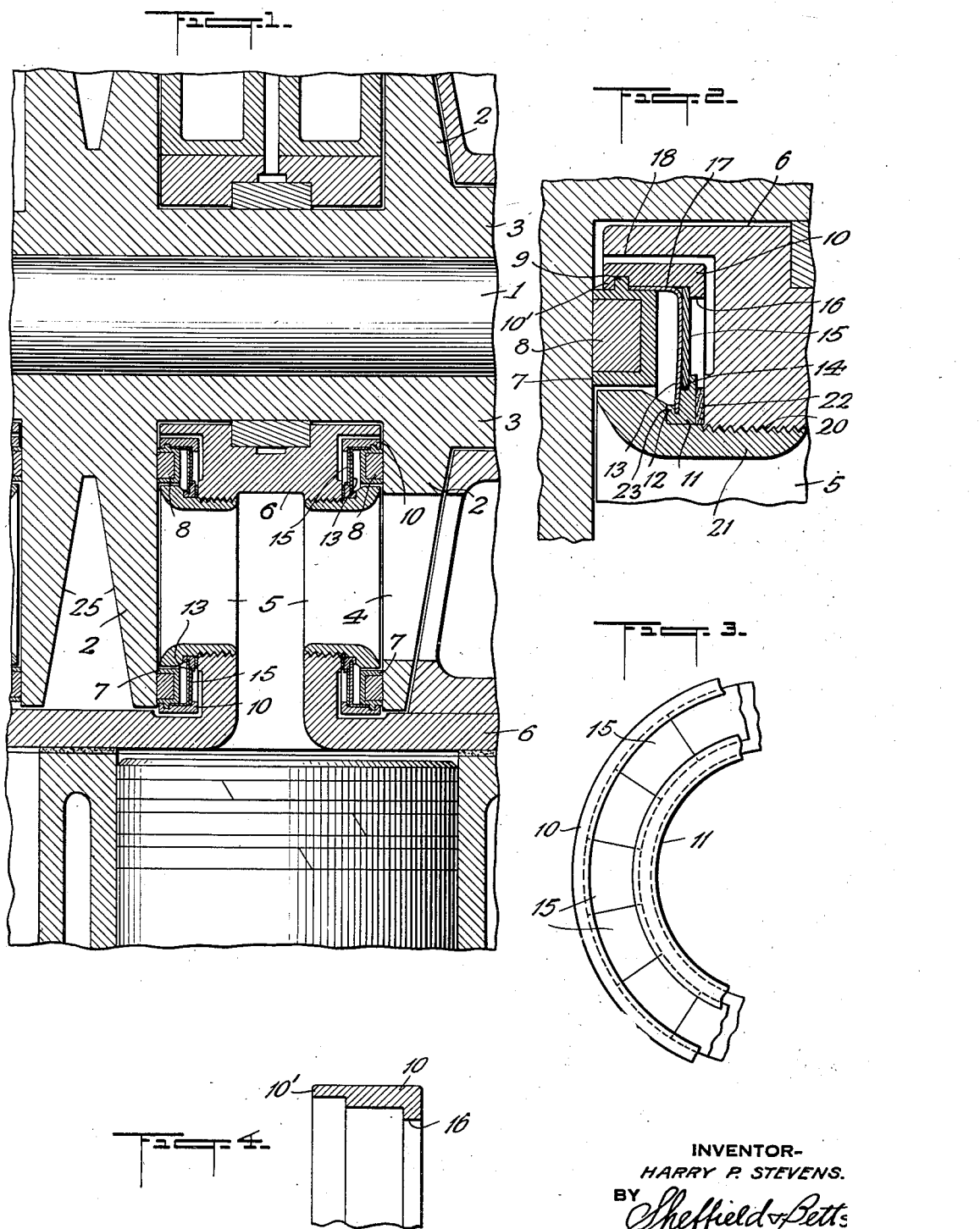
INVENTOR-
HARRY P. STEVENS.
BY Sheffield & Betts
HIS ATTORNEYS.

Patented Jan. 2, 1934

1,942,155

UNITED STATES PATENT OFFICE 1,942,155

PACKING RING AND VALVE FOR INTERNAL COMBUSTION ENGINES AND THE LIKE

Harry P. Stevens, Ossining, N. Y., assignor to Stevens Motors, Inc., a corporation of New York Application June 7, 1932. Serial No. 615,795

8 Claims. (Cl. 123—80d)

This invention relates generally to valves and packing rings where it is desired to produce a fluid-tight or gas-tight contact between two relatively moving surfaces. The invention relates particularly to providing gas-tight contacts between rotating rings of a disc valve automobile engine and adjacent parts of the engine casing about the inlet and the exhaust ports.

The object of the present invention is to improve the construction and simplify the manufacture of such valves and packing rings, and it is particularly designed to increase the permanency and the resisting qualities of the parts thereof so as to increase the effectiveness of the device and make it of much longer life, under adverse conditions of use, than heretofore.

The improvements herein described relate to the general construction of devices set forth and claimed in my prior patents, No. 1,488,296 of March 25, 1924 and 1,489,857 of April 8, 1924.

For a detailed description of the present preferred form of my invention reference may be had to the following specification and to the accompanying drawing forming a part thereof, in which Figure 1 is a transverse sectional view of two packing rings as applied on the sides of disc valves of an automobile engine or similar device;

Fig. 2 is an enlarged transverse, sectional view taken through one side of the annulus forming a ring;

Fig. 3 is a bottom view of a portion of one of the rings shown in section in Fig. 1;

Fig. 4 is a transverse, sectional view of the outer cylindrical portion of the packing ring before the margin is turned or spun inward to hold the contacting portion in position.

Referring to the drawing, the numeral 1 indicates a shaft on which the recessed discs 2 are carried by means of a sleeve 3. The valve discs 2 are provided with holes 4 permitting the passage of intake or exhaust gases through the same and through ports 5 in a suitable housing 6, as is known in the art.

The main parts of my improved packing ring may be described as follows:

The movable portion of the ring which contacts with the valve disc 2, comprises a grooved annular member 7 which is adapted to contain anti-friction material 8 which may consist of a combination of copper and graphite, or any other of the various anti-friction or self lubricating materials now on the market for such purposes. The grooved member 7 is provided with a circumferential rib or flange 9 on its outer surface which engages a cylindrical or annular ring 10 which is preferably crimped or turned over about the flange 9 to hold the parts in proper relative positions, as shown in Fig. 2.

The shape of the latter cylindrical ring 10 is illustrated in Fig. 4, being illustrative of the manner in which the ring is primarily formed before the contacting part of the packing is applied thereto. It will be seen that the ring 10 is provided with a somewhat reduced outer margin 10' within which the flange 9 may be placed. The margin 10' is then crimped or turned over by suitable devices known in the art, so as to hold the flange 9 rigidly in position within the ring 10 as indicated in Fig. 2.

However, before this is done, the other parts of the device are first assembled as follows:

An inner annular ring 11 is provided of somewhat smaller diameter than that of the ring 10. This ring is made substantially of the shape indicated in Fig. 2 and there is an inwardly turned or crimped flange 12 which holds the flexible portion or diaphragm 13 of the packing firmly in position. The ring 11 is also provided with a stepped portion or angular groove 14 which receives the inner ends of a series of semi-sectorial pieces of metal 15 as indicated in Figs. 2 and 3. The sectorial pieces 15 are also retained in position at their outer ends by an internal flange 16 on the margin of the ring 10. The flexible diaphragm 13 of the packing is preferably of rather thin gage and of a flexible and preferably resilient metal. It is provided with an outer cylindrical portion 17 which may be formed in any preferred way, as by die pressing or spinning. The cylindrical portion 17 of the flexible annulus 13 is preferably made of such an external diameter that it will have a tight or pressing fit with the external surface of the grooved ring 7.

The parts thus described may be assembled as follows:

First, the sectorial parts 15 are placed upon the flanges 16 and 14 of the rings 10 and 11. The flexible annulus 13 is then placed above the same and the margin 12 of the ring 11 spun or crimped over to hold the flexible diaphragm 13 tightly and said pieces 15 loosely in position on the ring 11. In Fig. 2, it will be noticed that there is a slight clearance between the annulus 13 and the inner ends of the plates 15. The grooved annular ring 7 is then inserted so that its flange 9 rests within the margin 10'. The latter is thereafter crimped or turned over the flange 9 into the position indicated in Fig. 2. The ring is then completely assembled for use.

The position of the ring in the housing of an automobile engine when in use is substantially similar to that described in my prior Patent No. 1,489,857 above referred to, that is, recesses 18 are provided and the housing 6 adjacent the port has screw threads 20 formed therein which engage a screw-threaded collar or nipple 21. A packing of suitable material 22 is inserted between the housing 6 and the ring 11 to insure a gas-tight seat for the ring 11 at that point. The collar or nipple 21 is provided with an annular surface 23 which bears upon the ring 11 and forces it against the packing 22 by virtue of the action of the screw-threads 20. The ring 11 then forms an anchorage for the packing in the housing of the device to which it is applied.

It will thus be seen that when the rings are assembled for use as indicated in Figs. 1 and 2, the flexible portion 13 of the packing ring will be held rigidly in position by the housing, while the cylindrical portion 17, together with its attached parts is capable of slight movement inward and outward parallel to the axis of the ring. The spring action of the flexible portion 13 is such that it will cause the grooved ring 7 and its packing material 8 to be forced with the necessary pressure against the disc valve 2 to make a substantially gas-tight joint therewith, although said disc may revolve rapidly when the engine is operating.

Furthermore, when air is compressed due to the compression of the engine, or pressure is produced due to combustion of the gases in the engine there is a slight leakage of the air or gases between the inner surface of the annular ring 7 and the adjacent collar 21. This permits pressure within the space between the ring 7 and the annular portion 13 of the resilient member. However, since this pressure is substantially equal and opposite upon said parts, there is a preponderance of said pressure to force the ring 7 toward the left when in the position indicated in Fig. 2. Consequently, since the internal annular area of the ring 7 is somewhat greater than one-half the internal area of the resilient portion 13, the pressure toward the left upon the ring 7, as in Fig. 2 will be correspondingly, somewhat increased according to the pressures in the space between said ring 7 and said resilient member 13.

This will tend to force the ring 7 into more positive contact with the valve disc 2 when the maximum contact is required, and therefore more effectively prevent leakage of compressed air or of combustion gases between the housing and valves.

It will thus be seen that I have produced a ring which is similar in general characteristics to the packing rings described and claimed in my prior patents above mentioned, but inasmuch as the annular member 13 and its cylindrical outer flange 17 are of comparatively thin metal or are of a small gage, they can be easily shaped without weakening the parts, and in addition to this, the sectorial plates 15 prevent any distortion of said thin metal owing to the pressure existing between the said annular portion 13 and the ring 7. In other words, the thin resilient portion 13 with its integral flange 17 provides an air-tight packing while its form is definitely retained without distortion by virtue of the use of the said sectorial pieces 15.

In this improved form of the disc valve engine the intermediate discs are preferably provided with V-shaped annular grooves or channels which form passages for intake or exhaust vapors and gases, as indicated at 25, Fig. 1.

This construction enables the engine to be operated by using only one intermediate disc valve for each pair of cylinders. This reduces the number of packing rings necessary, by about 50% over those shown in any prior patents above mentioned. In other words, the construction shown in said patents would require 24 packing rings for a six-cylinder engine, while in the present arrangement only 12 of such rings are required.

The above described construction retains all of the advantages incident to the packing rings described in my two patents above mentioned, and at the same time increases the durability and the ease of manufacture, in addition to making the rings more positive in action and less subject to defects due to manufacturing operations.

Although resilient diaphragms like those of this application are particularly useful in connection with rotary valve engines, it is obvious that they are useful in other apparatus where resilient diaphragms are subject to high pressures such as would distort or disrupt the same without the use of the supplemental retaining members which I have provided.

Having thus described this embodiment of my invention, I do not wish to be understood as being limited to the details of form, arrangement of parts and manner of use of my invention except as they are consistent with the scope of the accompanying claims, for various changes and adaptations may be made without departing from the spirit of my invention.

Having thus described this form of my invention, what I claim and desire to protect by Letters Patent is:

1. A unitary article of manufacture comprising, in combination, a stiff retaining ring, a thin resilient metallic diaphragm having one margin secured to said stiff ring, means for retaining the opposite margin of said diaphragm in fixed form, and supplemental substantially non-resilient loosely retained parts carried by said ring and said retaining means, external to said diaphragm, for preventing distortion of the latter.

2. A unitary metallic packing device comprising, in combination, a stiff bearing ring, a thin flexible metallic diaphragm having one margin secured to said stiff ring, means for retaining the opposite margin of said diaphragm in fixed form, and supplemental substantially non-resilient loosely retained parts carried by said packing device, external to said diaphragm, for preventing distortion of the latter.

3. A unitary metallic packing device comprising, in combination, a stiff bearing ring, a flexible metallic diaphragm secured to said ring at the outer circumferences of both of said parts, said bearing ring being free at its inner margin, an external binding ring adapted to hold said diaphragm in contact with said bearing ring, and substantially non-resilient loosely retained parts carried by said packing device external to said diaphragm for preventing distortion of the latter, and means attached to said diaphragm for clamping the inner edge of said diaphragm to a fixed support and for retaining the inner edges of said non-resilient parts in position.

4. A unitary metallic packing device comprising, in combination, a stiff bearing ring, a flexible metallic diaphragm secured to said ring at the outer circumferences of both of said parts, said bearing ring being free at its inner margin, an external binding ring adapted to hold said diaphragm in contact with said bearing ring, and a plurality of supporting plates carried by said packing external to said diaphragm for preventing distortion of the same, and means for mounting the inner margins of said diaphragm and said plates in position on a fixed support.

5. A unitary metallic packing device comprising, in combination, a stiff bearing ring, a flexible metallic diaphragm in contact with said ring at the outer margin of the latter, said bearing ring being free at its inner margin, an external ring having a cylindrical portion adapted to hold the margin of said diaphragm in contact with said bearing ring and having an internal flange on one margin thereof, supporting plates external to said diaphragm for preventing distortion of the latter and having their outer margins resting on said internal flange, and a smaller ring in which the inner margins of said diaphragm and said plates are held for maintaining said parts in operative position.

6. A unitary metallic packing device comprising, in combination, a stiff bearing ring, a flexible metallic diaphragm having a cylindrical flange in contact with the outer surface of said bearing ring, an external ring having a cylindrical portion adapted to hold said cylindrical flange in contact with said external ring and having an internal flange on one margin thereof, supporting plates external to said diaphragm for preventing distortion of the latter and having margins resting on said internal flange, and a concentric ring having an external flange and in which the opposite margin of said diaphragm is clamped, and on which flange said plates rest to maintain said parts in operative position.

7. A metallic packing comprising, in combination, a stiff bearing ring, a flexible ring or diaphragm having a cylindrical outer margin in contact with the outer surface of said bearing ring which is provided with an external flange or rib thereon, an external ring having a cylindrical portion adapted to hold said cylindrical margin in contact with said bearing ring and positively engaging said rib, said external ring having an inner flange on one margin thereof, sectorial supporting plates external to said diaphragm for preventing distortion of the latter and having margins resting on said inner flange, and a smaller concentric ring on which the inner margins of said plates are retained, and means on said smaller ring for securing said diaphragm and plates in position.

8. In a power operated device of the class described, an housing provided with a plurality of piston chambers and with circular recesses and ports intermediate said chambers, rotary valve members within said recesses, said members having two external portions between which are central annular channels, packing rings surrounding said ports and contacting with the exterior surfaces of the separated portions of said valve members, said packing rings comprising, a stiff bearing ring, a thin flexible diaphragm having one margin secured to said stiff ring, and means for retaining the opposite margin thereof, in fixed position about said port.

HARRY P. STEVENS.